United States Patent [19]

Collomb-Ceccarini et al.

[11] Patent Number: 4,564,605

[45] Date of Patent: Jan. 14, 1986

[54] CATALYST AND PROCESS FOR POLYMERIZING OLEFINS

[75] Inventors: Joelle Collomb-Ceccarini, Marseilles; Pierre Crouzet, Martigues, both of France

[73] Assignee: BP Chemicals Limited, London, England

[21] Appl. No.: 673,889

[22] Filed: Nov. 21, 1984

[30] Foreign Application Priority Data

Nov. 23, 1983 [FR] France ............... 83 18624

[51] Int. Cl.$^4$ ............................................. C08F 4/64
[52] U.S. Cl. ..................................... 502/110; 502/114; 502/115; 502/132; 502/134; 526/125; 526/151; 526/153
[58] Field of Search ............... 502/110, 114, 115, 126, 502/128, 132, 134

[56] References Cited

U.S. PATENT DOCUMENTS

| | | | |
|---|---|---|---|
| 2,943,063 | 6/1960 | Eby et al. | 502/110 X |
| 2,971,925 | 2/1961 | Winkler et al. | 502/110 |
| 3,118,865 | 1/1964 | Bruce et al. | 502/114 X |
| 3,135,809 | 6/1964 | Bosmajian | 502/114 X |
| 3,278,510 | 10/1966 | Ingberman | 502/110 X |
| 3,293,229 | 12/1966 | Levine | 502/110 X |
| 4,250,283 | 2/1981 | Caunt et al. | 502/110 X |
| 4,487,846 | 12/1984 | Bailly et al. | 502/110 X |
| 4,497,904 | 2/1985 | Blaya et al. | 502/110 X |

FOREIGN PATENT DOCUMENTS

| | | |
|---|---|---|
| 99774 | 2/1984 | European Pat. Off. . |
| 2474039 | 1/1981 | France . |

*Primary Examiner*—Patrick P. Garvin
*Attorney, Agent, or Firm*—Brooks Haidt Haffner & Delahunty

[57] ABSTRACT

The invention relates to a process for preparing supported catalysts for the copolymerization of ethylene with higher alpha-olefins, characterized in that a compound of a transition metal of Groups IV, V and VI of the Periodic Table of Elements, used at its maximum valency, is precipitated on to a support of magnesium chloride and possibly aluminum chloride by a reduction reaction in two stages, employing reducing agents selected for the first stage from among alkylaluminum dihalides, and for the second stage from among organometallic compounds with a higher reducing power than that of the alkylaluminum dihalides.

These catalysts are particularly well suited to the copolymerization in the gas phase of ethylene and higher alpha-olefins.

20 Claims, No Drawings

CATALYST AND PROCESS FOR POLYMERIZING OLEFINS

The present Invention relates to a new process for the preparation of catalysts, and the processes for using these catalysts for the production in the gas phase of copolymers of ethylene and other alpha-olefins.

It is known that catalyst systems for the polymerisation and copolymerisation of alpha-olefins, of the type known as "Ziegler-Natta", consist on the one hand, as catalysts, of compounds of transition metals belonging to Groups IV, V and VI of the Periodic Table of Elements, and on the other hand, as co-catalysts, of organometallic compounds of metals belonging to Groups I to III of the said Table.

It is also known that the properties of these catalyst systems, and in particular their reactivity in respect of ethylene and other alpha-olefins, can be strongly influenced by the presence of solid mineral compounds which may be co-precipitated with the said compounds of transition metals and/or which may be utilised as supports of the said transition metal compounds.

It is also known, in particular, that supported catalysts can be prepared, the supports containing essentially magnesium chloride and possibly aluminium chloride, and which may occur in the form of spheroidal particles with a narrow particle size distribution, on which supports there is precipitated a compound of a transition metal belonging to Groups IV, V and VI of the Periodic Table of Elements, particularly a titanium compound, which is known for its catalytic properties in the polymerisation and copolymerisation of ethylene and other alpha-olefins. This precipitation may be carried out by a reduction reaction of a compound of a transition metal at its maximum valency by means of a reducing agent chosen from among organo-magnesium, organo-zinc or organo-aluminium compounds. The reduction reaction may also be performed in the presence of an electron donor compound.

It is further known that one may use such supported catalysts for the production in the gas phase of copolymers of ethylene and higher alpha-olefins, it being possible for the said copolymers to have a density comprised between about 0.910 and about 0.960. Obtaining such copolymers by a process of copolymerisation in the gas phase requires the use of a reaction gas mixture in which the proportion of higher alpha-olefin is relatively high, bearing in mind the fact that the speed of polymerisation of the higher alpha-olefin is distinctly lower than that of ethylene. In particular when one is producing copolymers of a density of less than 0.940 and/or when one is using as higher alpha-olefins, comparatively heavy alpha-olefins such as 1-hexene, 4-methyl-1-pentene, 1-heptene or 1-octene, possible condensations of higher alpha-olefins in the copolymerisation medium are to be feared, as these are prejudicial to good exploitation of a gas-phase copolymerisation process. Hence the necessity of operating under relatively low total pressures, involving relatively low copolymerisation speeds and consequently low productivity.

It has now been found that it is possible to prepare catalysts making it possible to produce in the gas phase copolymers of ethylene and at least one higher alpha-olefin comprising from 3 to 8 carbon atoms, which copolymers have a density comprised between approximately 0.910 and 0.960, and in particular comprised between about 0.910 and 0.940, from gaseous mixtures of ethylene and higher alpha-olefins having, for the production of copolymers of a given density, contents of higher alpha-olefins which are much lower than in the case where the previously known catalysts are used.

The catalysts prepared according to the present invention make it possible in particular to produce at an excellent productivity level copolymers with a density comprised between 0.910 and 0.940 without the risk of condensation of higher alpha-olefins in the copolymerisation medium.

The object of the present invention is the preparation of new supported catalysts, the support containing basically magnesium chloride and optionally aluminium chloride, and having specific properties, and the catalyst being a compound of a transition metal belonging to Groups IV, V and VI of the Periodic Table of Elements, especially titanium, in a valency condition below its maximum value, this compound being obtained by a reduction reaction in two stages under special conditions.

The present invention also relates to a process for the use of these new supported catalysts for the production in the gas phase of copolymers of ethylene and at least one higher alpha-olefin comprising from 3 to 8 carbon atoms, which copolymers have a density comprised between about 0.910 and 0.960.

According to the invention the catalyst support consists of particles based essentially on magnesium chloride and optionally aluminium chloride, which have the following characteristics:

the particles have a spheroidal shape defined by the fact that if D and d are the large and small axes of these particles, $D/d \leq 1.3$;

the particles have a mean diameter by mass adjustable at will and comprised between about 10 and 100 microns;

the particle size distribution of these particles is such that the ratio $D_m/D_n$ of the mean diameter by mass, $D_m$, to the mean diameter by number, $D_n$, is less than or equal to 3, for example comprised between 1.1 and 2.5; more especially the particle size distribution of these particles is very narrow and such that the ratio $D_m/D_n$ is comprised between 1.1 and 1.5; furthermore the support comprises practically no particles with a diameter of greater than $2 \times D_m$ or less than $0.2 \times D_m$;

the particles may have a slightly uneven surface such as that of a raspberry, but preferably a very smooth surface;

the specific surface area of the particles is comprised between about 20 and 60 $m^2/g$ (BET);

the density of the particles is comprised between about 1.2. and 2.2;

the particles consist essentially of magnesium chloride and optionally of an aluminium chloride; the particles contain for preference a low proportion of products with an Mg—C bond and also an electron donor compound and the atomic ratio $Cl/(Mg+3/2)Al$ is consequently slightly less than 2.

The supports thus defined may in particular be prepared by reacting an organo-magnesium compound with a chlorinated organic compound, in the presence of an electron donor compound. The organo-magnesium compound chosen may be a product of the formula $R_1MgR_2$, or an addition complex of the formula $R_1MgR_2, xAl(R_3)_3$, in which formulae $R_1$, $R_2$ and $R_3$ are identical or different alkyl radicals having from 2 to 12 carbon atoms and x is comprised between 0.001 and 10, preferably comprised between 0.01 and 2. The chlorinated organic compound chosen may be an alkyl chloride of the formula $R_4Cl$ in which $R_4$ is a secondary or preferably tertiary alkyl radical having from 3 to 12 carbon atoms. The electron donor compound used is an organic compound which comprises at least one atom of oxygen, sulphur, nitrogen or phosphorus. It may be chosen from among a large variety of products such as the amines, amides, phosphines, sulphoxides, sulphones or esters. Among the electron donor compounds, there may be chosen in particular an aliphatic ether oxide of the formula $R_5OR_6$ in which $R_5$ and $R_6$ are identical or different alkyl radicals having from 1 to 12 carbon atoms. Moreover, the various reactants involved in the preparation of the supports as defined above may be employed under the following conditions:

the molar ratio $R_4Cl/R_1MgR_2$ is comprised between 1.5 and 2.5 and preferably comprised between 1.85 and 1.95;

the molar ratio $R_4Cl/R_1MgR_2$, $xAl(R_3)_3$ is comprised between $1.5(1+3x/2)$ and $2.5(1+3x/2)$, and preferably comprised between $1.85(1+3x/2)$ and $1.95(1+3x/2)$;

the molar ratio between the electron donor compound and the organo-magnesium compound ($R_1MgR_2$ or $R_1MgR_2$, $xAl(R_3)_3$) is comprised between 0.01 and 2, and preferably comprised between 0.01 and 1;

the reaction between the organo-magnesium compound and the chlorinated organic compound takes place with stirring in a liquid hydrocarbon at a temperature comprised between 5° C. and 80° C. and in particular between 35° and 80° C.

The preparation of the catalysts from the supports thus defined is performed by precipitation on to the said supports of a compound of a transition metal belonging to Groups IV, V and VI of the Periodic Table of Elements, this precipitation being performed by a reaction in two stages of the compound of transition metal used at its maximum valency. The transition metal compound used may be for example a titanium compound of the formula $Ti(OR_7)_{(4-n)}X_n$, in which $R_7$ is an alkyl group containing from 2 to 6 carbon atoms, X is a chlorine or bromine atom and n is a whole number or fraction such that $2 \leq n \leq 4$. Among these titanium compounds preference is given in particular to titanium tetrachloride.

The first stage of the reduction reaction is performed by means of a reducing agent chosen from among the alkylaluminium dihalides of the formula $Al(R_8)X_2$, in which $R_8$ is an alkyl group containing from 2 to 12 carbon atoms and X is a chlorine or bromine atom. In particular the alkylaluminium dihalide chosen may be ethylaluminium dichloride or isobutylaluminium dichloride.

The second stage of the reduction reaction is performed by means of another reducing agent chosen among the organo-metallic compounds of metals belonging to Groups II and III of the Periodic Table of Elements, these organo-metallic compounds having a greater reducing power in respect of the compounds of the said transition metals, than that of alkylaluminium dihalides. In particular one may use organo-magnesium compounds of the formula $R_9MgR_{10}$ in which $R_9$ and $R_{10}$ are identical or different alkyl groups containing from 2 to 12 carbon atoms, organo-zinc compounds of the formula $Zn(R_{11})_{(2-y)}X_y$ in which $R_{11}$ is an alkyl group having from 2 to 12 carbon atoms, X is a chlorine or bromine atom and y is equal to 0 or a fraction less than 1, and organo-aluminium compounds of the formula $Al(R_{12})_{(3-x)}X_x$ in which $R_{12}$ is an alkyl group having 2 to carbon atoms, X is a chlorine or bromine atom and x is a whole number or fraction such that $0 \leq x \leq 2$. The reduction reaction may be carried out in the presence of an electron donor compound chosen from among a large variety of organic compounds comprising at least one atom of oxygen, sulphur, nitrogen or phosphorus, such as for example the amines, amides, phosphines, sulphoxides, sulphones or ethers.

The relative molar quantities of the various compounds used (magnesium chloride and optional aluminium chloride of the support, transition metal compound, alkylaluminium dihalide used in the first stage of the reduction reaction, reducing agent used in the second stage of the reduction reaction, electron donor) are such that:

magnesium chloride and optional aluminium chloride of the support/transition metal compound is comprised between 1 and 50 and preferably comprised between 2.5 and 10.

alkylaluminium dihalide used in the first stage of the reduction reaction/transition metal compound is comprised between 0.2 and 2, preferably comprised between 0.3 and 0.8, reducing agent used in the second stage of the reduction reaction/transition metal compound is comprised between 0.1 and 2, preferably comprised between 0.3 and 0.6 electron donor compound/transition metal compound is comprised between 0 and 5, preferably comprised between 0.1 and 1.

The electron donor compound chosen may in particular be an aliphatic ether oxide of the formula $R_{13}OR_{14}$ in which $R_{13}$ and $R_{14}$ are identical or different alkyl groups comprising from 1 to 12 carbon atoms. In this case the aliphatic ether oxide may be used in a quantity such that the molar ratio of the aliphatic ether oxide to the transition metal compound is comprised between 0.1 and 0.5.

The two stages of the reduction reaction may be effected at a temperature comprised between $-30°$ C. and 100° C., preferably comprised +5° C. and 50° C., with stirring, in a liquid hydrocarbon medium.

The reduction reaction of the transition metal compound effected in the first stage by means of alkylaluminium dihalide, such as alkylaluminium dichloride, produces on the support a solid co-precipitate comprising the transition metal compound at a valency less than its maximum and aluminium trichloride. It would appear that the presence of this solid co-precipitate in the catalyst is largely responsible for the special properties of the catalysts prepared accordingly to the present invention, and in particular for their aptitude for easy copolymerisation of higher alpha-olefins with ethylene. Nevertheless, the alkylaluminium dihalides used have a relatively low reducing power in respect of the transition metal compound so as to make it possible to precipitate on to the support an adequate quantity of transition metal compound and consequently to produce a sufficiently active catalyst. That is why in the second stage of the reduction reaction another reducing agent is used, which is more active than alkylalumium dihalides, in order to reduce and consequently precipitate on to the support practically the whole of the transition metal compound employed.

It is possible to operate in various ways: for example one may introduce gradually into the liquid hydrocarbon medium containing the support and the transition metal compound first of all the alkylaluminium dihalide, then the other reducing agent. It is also possible to introduce gradually and simultaneously into the liquid hydrocarbon medium containing the support on the one hand the transition metal compound and on the other hand first of all the alkylaluminium dihalide and then the other reducing agent. However, it is generally preferable to introduce into the liquid hydrocarbon medium containing the support and the alkylaluminium dihalide first of all gradually a part of the transition metal compound, then rapidly the other reducing agent and finally gradually the remaining quantity of the transition metal compound.

In all cases, however, it is essential that at least 10% of the total quantity of the transition metal compound employed should react, in the first stage of the reduction reaction, with the alkylaluminium dihalide, before the introduction in the second stage of the reduction reaction of the other reducing agent into the reaction medium, if one wishes to obtain catalysts having the desired properties for the copolymerisation of ethylene with other alpha-olefins.

It has in fact been shown unexpectedly that if during the reduction reaction of the transition metal compound, alkylaluminium dihalides are used simultaneously with or subsequently to the other reducing agent, the catalysts obtained do not have the desired properties. Likewise, it has been found that catalysts particularly suited for the copolymerisation of ethylene and other alpha-olefins, such as the catalysts prepared according to the present invention, cannot be obtained by a chemical or physical process of incorporation of aluminium trichloride into the support, prior to the reduction reaction of the transition metal compound.

The catalysts of the present invention basically contain, on the one hand, chlorides and optionally bromides of magnesium, and, on the other hand, chlorides and/or bromides of aluminium and optionally of zinc or another metal of Groups II and III of the Periodic Table of Elements, and a transition metal compound of Groups IV, V and VI of this Table, in a valency state below its maximum value, and they occur in the form of spheroidal particles of a diameter Dm comprised between 10 and 100 microns and having a particle size distribution such that $Dm/Dn \leq 3$.

These catalysts may be used for the copolymerisation of ethylene and one or more higher alpha-olefins, by using the known techniques of polymerization in the gas phase and in particular by means of a fluidised bed.

The copolymerisation is effected by using as co-catalyst an organo-metallic or halogen-organo-metallic compound of a metal belonging to Groups I to III of the Periodic Table of Elements, preferably an organo-aluminium or halogen-organo-aluminium compound. The components of the catalytic system must be employed in proportions such that the atomic ratio of the quantity of metal in the co-catalyst to the quantity of transition metal in the catalyst is comprised between 0.5 and 200, perferably comprised between 1 and 50.

The catalytic systems used may be employed as they are or after undergoing a prepolymerisation operation. This prepolymerisation operation which leads to particles whose dimensions and forms are more or less homothethic with those of the initial catalyst, consists in contacting the catalyst and co-catalyst into contact with ethylene possibly in admixture with one or more higher alpha-olefins, it being possible for the prepolymerisation to be performed in one or two stages as described below.

The commencement of the prepolymerisation reaction (or the first stage of this reaction when one operates in two distinct stages) is of necessity carried out in suspension in an inert liquid medium.

This first prepolymerisation stage may be carried on until 10 g of polyethylene or copolymer of ethylene are obtained per milligramme atom of transition metal. Then the prepolymerisation may be continued either in suspension in a liquid hydrocarbon medium or in the dry state; in general it may be continued, whilst preserving a suitable activity in the catalyst, until the prepolymer obtained contains between $2 \times 10^{-3}$ and $10^{-1}$, and preferably between $4 \times 10^{-3}$ and $3 \times 10^{-2}$ milligramme atoms of transition metal per gramme.

The prepolymer obtained according to this process occurs in the form of a powder consisting of particles having a mean diameter by mass generally comprised between 80 and 300 microns, preferably comprised between 100 and 240 microns, and a particle size distribution such that the ratio Dm/Dn is less than or equal to 3, preferably comprised between 1.1. and 2.5; the prepolymer powder contains practically no particles with a diameter greater than $2 \times Dm$ or less than $0.2 \times Dm$.

The copolymerisation in the gas phase by means of a fluidised bed may be performed according to the current techniques of polymerisation and co-polymerisation in a fluidised bed. However, the gas mixture used for the fluidisation may comprise, in addition to the monomers, ethylene and higher alpha-olefins to be polymerised, an inert gas such as nitrogen, methane or ethane and possibly hydrogen, to guarantee the adjustment of the molecular weights of the copolymers obtained. The presence of an inert gas in this gas mixture appreciably improves the elimination of the heat of reaction and produces a favourable modification on the kinetics of copolymerisation. The speed of fluidisation in the fluidised bed reactor may be sufficiently high to guarantee homogenisation of the fluidised bed and to eliminate effectively the heat given off by the copolymerisation, without having recourse to any other means of homogenisation, especially mechanical. The speed of fluidisation is preferably comprised between 3 and 10 times the minimum speed of fluidisation, that is to say generally comprised between about 20 and 80 cm/sec. In passing through the fluidised bed, only a part of the ethylene and the higher alpha-olefins polymerises in contact with the particles of copolymer which are in a state of growth. The gas mixture containing the fraction of ethylene and higher alpha-olefin which has not reacted leaves the fluidised bed and passes through a cooling system intended to eliminate the heat produced during the reaction, before being recycled into the fluidised bed reactor by means of a compressor.

Gas phase copolymerisation may be carried out at a temperature comprised between about 50° C. and 100° C., preferably comprised between 70° C. and 95° C., under a total pressure which may vary within a range generally comprised between 0.5 MPa and 4 MPa.

The copolymers of ethylene and higher alpha-olefin of a density comprised between 0.910 and 0.960 may be obtained by means of the new catalysts prepared according to the present invention, by copolymerisation in the gas phase at a temperature of 80° C., for example of mixtures of ethylene and 1-butene such that the ratio of the partial pressure of 1-butene to that of ethylene is at most equal to 0.35, or of mixtures of ethylene and 4-methyl-1-pentene such that the ratio of the partial pressure of 4-methyl-1-pentene to that of ethylene is at most equal to 0.20.

These copolymers occur directly after the copolymerisation in the gas phase in the form of powders consisting of non-sticky particles. These copolymer powders, which are easy to handle, have a relatively high bulk density comprised between about 0.30 and 0.55 g/cm$^3$.

The copolymer particles making up these powders have a spheroidal shape defined by the fact that if D and d are the large and small axes respectively of these particles, $D/d \leq 1.3$. These particles have a mean diameter by mass, Dm, comprised between 300 and 1500 microns, preferably comprised between 500 and 1200 microns. The particle size distribution of these particles is such that the ratio Dm/Dn is less than or equal to 3.5, preferably comprised between 1.2 and 3. This ratio or width of particle size distribution of the powder which makes up the fluidised bed is dependent not only on that of the prepolymer utilised, but also on the mean residence time of the copolymer in the fluidised bed reactor and also on the rate at which the catalytic system loses its activity during the copolymerisation reaction.

These copolymers, the melt index of which under 2.16 kg and at 190° C., according to the Standard ASTM D 1238, may vary between 0.1 and 30 g per 10 minutes, have especially interesting applications, for example, in the production of films with a high mechanical strength.

Method of determining mean diameters by mass (Dm) and by number (Dn) of particles. (Support, catalyst, prepolymer, polymer, copolymer)

According to the invention the mean diameters by mass (Dm) and by number (Dn) of the particles of support, catalyst, prepolymer, polymer or copolymer, are measured from microscope observations, by means of the OPTOMAX image analyser (Micro-Measurements Ltd., Great Britain). The measurement principle consists in obtaining from the experimental study by light-optical microscopy of a population of particles, a table of absolute frequencies giving the number ($n_i$) of particles belonging to each class (i) of diameter, each class (i) being characterised by an intermediate diameter ($d_i$), comprised between the limits of the said class.

According to the authorised French standard NF X 11-630 of June 1981, Dm and Dn are provided by the following formulae:

$$\text{mean diameter by mass: } Dm = \frac{\Sigma ni\,(di)^3\,di}{\Sigma ni\,(di)^3}$$

$$\text{mean diameter by number: } Dn = \frac{\Sigma ni \cdot di}{\Sigma ni}$$

The ratio Dm/Dn characterises the particle size distribution; it is sometimes called the "width of particle size distribution".

Measuring by means of the OPTOMAX image analyser is performed by means of an inverted microscope which makes it possible to examine the suspensions of particles at an enlargement comprised between 16 and 200×. A television camera picks up the images given by the inverted microscope and transmits them to the computer which analyses the images line by line and dot by dot on each line, with a view to determining the dimensions or diameters of the particles and then classifying them.

The following non-restrictive Examples illustrate the present Invention.

EXAMPLE 1

Preparation of the support

Into a 5-liter stainless steel reactor provided with a stirring system rotating at 750 revolutions per minute and containing 800 ml of n-hexane, there are introduced at ambient temperature (20° C.) and under a blanket of nitrogen: 1725 ml of a solution of butyloctylmagnesium in n-hexane containing 1500 milligramme atoms of magnesium and 61 ml (300 millimoles) of di-isoamyl ether. The reactor is then heated to 50° C. and there are added drop by drop, over 3 hours, 313 ml of tert.-butyl chloride (or 2850 millimoles). At the end of this addition, the suspension is maintained at 50° C. for 3 hours, and then the precipitate obtained is washed five times with n-hexane. The solid washed product (A) constitutes the support, whose chemical composition per gramme atom of magnesium is as follows:

1.96 gramme atoms of chlorine;
0.04 gramme equivalents of Mg-C bonds and
0.01 mole of di-isoamyl ether.

On examination under the microscope it is seen to be a powder consisting of spheroidal particles (the mean ratio between large and small axes D/d of the particle is equal to 1.3) having a mean diameter by mass Dm=32 microns and a particle size distribution such that Dm/Dn=1.3; there are less than 0.1% by weight of particles with a diameter less than 5 microns; the density of the product is equal to 1.8 and its specific surface area is 41 m$^2$/g (BET).

Preparation of the catalyst

Into a 2 liter stainless steel reactor provided with a stirrer system rotating at 300 revolutions per minute, there are introduced at ambient temperature (20° C.) 770 ml of n-hexane, 380 ml of suspension in n-hexane of the product (A) prepared previously, containing 370 millimoles of MgCl$_2$, 6 ml of di-isoamyl ether and 65 ml of a 0.77 molar solution of ethylaluminium dichloride in n-hexane.

The reactor is heated to 35° C. In a first stage there are introduced gradually over 1 hour 100 ml of a 0.5 molar solution of titanium tetrachloride in n-hexane. At the end of this introduction there is rapidly added to the reaction mixture 80 ml of a 0.625 molar solution of diethylaluminium monochloride in n-hexane. Then in a second stage there are introduced again, gradually over 1 hour, 100 ml of the 0.5 molar solution of titanium tetrachloride in n-hexane. At the end of this latter introduction, the reaction mixture is heated to 80° C. and maintained at this temperature for 2 hours. The solid product obtained is then washed five times with n-hexane to give the catalyst (B) ready for use. Analysis of this catlyst (B) shows that it contains per gramme atom of total titanium:

0.98 gramme atom of trivalent titanium,
0.02 gramme atom of tetravalent titanium,
3.6 gramme atoms of magnesium,
10.5 gramme atoms of chlorine,
0.37 gramme atom of aluminium and less than
0.01 mole of di-isoamyl ether (detection threshold)

The catalyst (B) occurs in the form of solid spheroidal particles having a mean diameter by mass Dm=33 microns and a particle size distribution such that Dm/Dn=1.4.

Prepolymerisation

Into a 5-liter stainless steel reactor provided with a stirrer system rotating at 750 revolutions per minute and containing 3 liters of n-hexane heated to 50° C., there are introduced under a blanket of nitrogen 10.65 millimoles of tri-n-octylaluminium (TnOA) and a suspension in n-hexane of the catalyst (B) prepared previously, this suspension containing 3.55 milligramme atoms of titanium. The reactor is heated rapidly to 70° C. There are then introduced a volume of 4 liters of hydrogen, measured under normal conditions, then ethylene at a constant throughput of 177 g/hr, over 3 hours. At the end of the reaction, the prepolymer suspension obtained is transferred into a rotating evaporator under vacuum. In this way, 530 g of a dry prepolymer powder (C) are obtained, containing per gramme $6.7 \times 10^{-3}$ milligramme atoms of titanium. This prepolymer powder consists of spheroidal particles having a mean diameter by mass $Dm = 200$ microns approx. and a particle size distribution such that $Dm/Dn = 1.5$.

Copolymerisation

One operates by means of a fluidised bed reactor of 15 cm diameter, heated to 80° C. and fed with a reaction gas mixture propelled at a rising speed of 20 cm/sec., the reaction gas mixture consisting of hydrogen, ethylene and 1-butene, the partial pressures (pp) of which are as follows:
  pp hydrogen = 0.14 MPa
  pp ethylene = 0.73 MPa
  pp 1-butene = 0.13 MPa with a ratio of pp 1-butene/pp ethylene = 0.178.

There are introduced into this reactor 800 g of an inert and de-gassed polyethylene powder by way of charge powder, then 20 g of the prepolymer (C) prepared previously, containing 0.134 milligramme atom of titanium. During the copolymerisation reaction there are added ethylene, 1-butene and hydrogen in such a way that the partial pressures of these various constituents remain constant. The reaction is stopped when 1000 g of copolymer are produced. 1000 g of powder are then withdrawn from the fluidised bed reactor. There then remain 800 g of powder in the reactor, this powder being utilised by way of charge powder to carry out a new copolymerisation operation under identical conditions. After five identical copolymerisation operations performed in this way, there is finally obtained a copolymer powder which contains less than 2 percent by weight of the polythylene powder initially used as charge powder, so that the powder obtained is more or less representative of the copolymer produced.

This copolymer powder has the following characteristics
  spheroidal particles with a mean diameter by mass $Dm = 750$ microns;
  density of copolymer: 0.920;
  content by weight of units derived from 1-butene: 7.3%
  content of titanium: 6 ppm;
  bulk density: 0.40 g/cm$^3$;
  melt index measured at 190° C. under a charge of 2.16 kg ($MI_{2.16}$): 1.3 g/10 minutes;
  flow parameter, n: 1.52, n being equal to: log ($MI_{21.6}/MI_{2.16}$), $MI_{21.6}$ being the melt index measured at 190° C. under a charge of 21.6 kg.

EXAMPLE 2

Prepolymerisation

One operates as in Example 1 except for the fact that instead of introducing into the reactor 10.65 millimoles of TnOA and a quantity of catalyst (B) corresponding to 3.55 milligramme atoms of titanium, there are introduced 8.52 millimoles of TnOA and a quantity of catalyst (B) corresponding to 2.74 milligramme atoms of titanium. In this way, 530 g of a dry prepolymer powder (D) are obtained containing per gramme $5.2 \times 10^{-3}$ milligramme atoms of titanium. This prepolymer powder consists of spheroidal particles having a mean diameter by mass $Dm = 215$ microns and a particle size distribution such that $Dm/Dn = 1.5$.

Copolymerisation

One operates as in Example 1 except for the fact that instead of using 20 g of prepolymer (C), there are employed 20 g of the prepolymer (D) prepared previously, containing 0.104 milligramme atom of titanium and the partial pressures (pp) of the various constituents of the reaction gas mixture are as follows:
  pp hydrogen = 0.165 MPa
  pp ethylene = 0.822 MPa
  pp 1-butene = 0.013 MPa
with a ratio pp 1-butene/pp ethylene = 0.016.

The copolymer powder obtained in this way has the following characteristics:
  spheroidal particles having a mean diameter by mass $Dm = 720$ microns;
  density of copolymer: 0.955;
  content weight of units derived from 1-butene: 0.5%;
  titanium content: 7 ppm;
  bulk density: 0.45 g/cm$^3$;
  melt index measured at 190° C. under a charge of 8.5 kg ($MI_{8.5}$): 1.4 g/10 minutes;
  flow parameter, n: 1.84, n being equal to log ($MI_{21.6}/MI_{8.5}$)/log (21.6/8.5).

EXAMPLE 3

Copolymerisation

One operates as in Example 1, except for the fact that one replaces 1-butene in the reaction gas mixture by 4-methyl-1-pentene and the partial pressures (pp) of the various constituents of the reaction gas mixture are as follows:
  pp hydrogen = 0.15 MPa
  pp ethylene = 0.74 MPa
  pp 4-methyl-1-pentene = 0.11 MPa
with a ratio of pp 4-methyl-1-pentene/pp ethylene = 0.149.

The copolymer powder obtained in this way has the following characteristics:
  spheroidal particles having a mean diameter by mass $Dm = 750$ microns;
  density of copolymer: 0.914;
  content by weight of units derived from 4-methyl-1-pentene: 12%;
  titanium content: 6 ppm;
  bulk density: 0.40 g/cm$^3$;
  melt index $MI_{2.16}$:1 g/10 minutes;
  flow parameter, n: 1.50, n being equal to: log ($MI_{21.6}/MI_{2.16}$).

EXAMPLE 4

Preparation of the catalyst

One operates as in Example 1 except for the fact that instead of introducing 6 ml of di-isoamylether into the reactor, there are introduced 2 ml of di-isoamylether. A catalyst (E) is obtained which contains per gramme atom of total titanium:
0.97 gramme atom of trivalent titanium,
0.03 gramme atom of tetravalent titanium,
3.5 gramme atoms of magnesium,
10.2 gramme atoms of chlorine,
0.47 gramme atom of aluminium and less than
0.01 mole of di-isoamylether.
This catalyst occurs in the form of solid spheroidal particles having a mean diameter by mass $Dm=33$ microns approx. and a particle size distribution such that $Dm/Dn=1.5$.

Prepolymerisation

One operates as in Example 1 except for the fact that instead of using catalyst (B), catalyst (E) prepared previously is employed. There are obtained approximately 530 g of a dry prepolymer powder(F) containing per gramme $6.7 \times 10^{-3}$ milligramme atoms of titanium. This prepolymer occurs in the form of a powder consisting of spheroidal particles having a mean diameter by mass $Dm=200$ microns and a particle size distribution such that $Dm/Dn=1.6$.

Copolymerisation

One operates as in Example 1 except for the fact that instead of using the prepolymer (C), the prepolymer (F) prepared previously is employed and the partial pressures (pp) of the various constituents of the reaction gas mixture are as follows:
pp hydrogen=0.10 MPa
pp ethylene=0.71 MPa
pp 1-butene=0.19 MPa
with a ratio pp 1-butene/pp ethylene=0.268.
The copolymer powder obtained in this way has the following characteristics:
spheroidal particles having a mean diameter by mass $Dm=800$ microns;
density of copolymer: 0.914;
content by weight of units derived from 1-butene: 10.7;
titanium content: 5 ppm;
bulk density: 0.41 g/cm$^3$;
melt index $MI_{2.16}=1.5$ g/10 minutes;
flow parameter, n: 1.47, n being equal to: log ($MI_{21.6}/MI_{2.16}$).

EXAMPLE 5

Preparation of the support

Into a 5-liter stainless steel reactor provided with a stirrer system rotating at 600 revolutions per minute and containing 495 ml of n-hexane there are introduced at ambient temperatures (20° C.) and under a blanket of nitrogen 1000 ml of a 0.87 molar solution of di-n-butyl-magnesium in n-hexane and 10.6 ml (52 millimoles) of di-isoamylether. The reactor is heated to 50° C. and there are introduced slowly over 3 hours a mixture comprising on the one hand 385 ml of a 9 molar solution of tert.-butyl chloride in n-hexane and on the other hand 106 ml (520 millimoles) of di-isoamylether. At the end of this introduction the suspension is maintained at 50° C. for 3 hours and then the precipitate obtained is washed five times with n-hexane. The solid washed product constitues the support (G) having the following chemical composition per gramme atom of magnesium:
1.97 gramme atoms of chlorine;
0.03 gramme equivalent of Mg-C bonds and
0.02 mole of di-isoamylether.
On examination under the microscope, the support (G) is shown to be a powder consisting of spheroidal particles having a mean diameter by mass $Dm=30$ microns approx. and a particle size distribution such that $Dm/Dn=1.2$.

Preparation of the catalyst

Into a 2-liter stainless steel reactor provided with a stirrer system rotating at 300 revolutions per minute, there are introduced at ambient temperature (20° C.) 750 ml of n-hexane, 400 ml of suspension in n-hexane of the support (G) prepared previously, containing 370 millimoles of $MgCl_2$, 6 ml of di-isoamylether and 39 ml of a 0.77 molar solution of ethylaluminium dichloride in n-hexane.
The reactor is heated to 35° C. There are introduced in a first stage, gradually over 1 hour, 100 ml of a 0.5 molar solution of titanium tetrachloride in n-hexane. At the end of this introduction there are added to the reaction mixture rapidly 64 ml of a 0.625 molar solution of diethylaluminium mono-chloride in n-hexane. Then in a second stage there are again introduced, gradually over 1 hour, 100 ml of a 0.5 molar solution of titanium tetrachloride in n-hexane. At the end of this latter introduction the reaction mixture is heated to 80° C. and maintained at this temperature for 2 hours. The solid product obtained is then washed five times with n-hexane to give the catalyst (H) ready for use. Analysis of this catalyst (H) shows that it contains per gramme atom of total titanium:
0.76 gramme atom of trivalent titanium,
0.24 gramme atom of tetravalent titanium,
4.6 gramme atoms of magnesium,
12.7 gramme atoms of chlorine,
0.37 gramme atom of aluminium and less than
0.01 mole of di-isoamylether.
The catalyst (H) occurs in the form of solid spheroidal particles having a mean diameter by mass $Dm=30$ microns approx. and a particle size distribution such that $Dm/Dn=1.2$.

Prepolymerisation

One operates as in Example 1, except for the fact that instead of using catalyst (B), catalyst (H) prepared previously is employed. The prepolymer powder (I) obtained in this way consists of spheroidal particles having a mean diameter by mass $Dm=180$ microns and a particle size distribution such that $Dm/Dn=1.3$.

Copolymerisation

One operates as in Example 1, except for the fact that instead of using prepolymer (C), the prepolymer (I) prepared previously is employed and the partial pressures (pp) of the various constituents of the reaction gas mixture are as follows:
pp hydrogen=0.14 MPa
pp ethylene=0.72 MPa
pp 1-butene=0.14 MPa
with a ratio pp 1-butene/pp ethylene=0.194.
The copolymer powder thus obtained has the following characteristics:

spheroidal particles having a mean diameter by mass Dm=650 microns;
density of copolymer: 0.918;
content by weight of units derived from 1-butene: 7.8%;
titanium content: 7 ppm;
bulk density: 0.41 g/cm$^3$;
melt index MI$_{2.16}$:1.5 g/10 minutes;
flow parameter, n: 1.47, n being equal to: log/MI$_{21.6}$/MI$_{2.16}$).

EXAMPLE 6

Copolymerisation

One operates as in Example 1, except for the fact that instead of using the prepolymer (C), the prepolymer (I) prepared in Example 5 is used and the partial pressures (pp) of the various constituents of the reaction gas mixture are as follows:
pp hydrogen=0.22 MPa
pp ethylene=0.72 MPa
pp 1-butene=0.06 MPa
with a ratio of pp 1-butene/pp ethylene=0.08.

The copolymer powder thus obtained has the following characteristics:
spheroidal particles having a mean diameter by mass Dm=610 microns;
density of copolymer: 0.931;
content by weight of units derived from 1-butene: 3.3%;
titanium content: 8 ppm;
bulk density: 0.43 g/cm$^3$;
melt index, MI$_{2.16}$: 1 g/10 minutes
flow parameter, n: 1.63, n being equal to: log (MI$_{21.6}$/MI$_{2.16}$).

EXAMPLE 7

Preparation of the catalyst

Into a 2-liter stainless steel reactor provided with a stirrer system rotating at 300 revolutions per minute, there are introduced at ambient temperature (20° C.) 750 ml of n-hexane, 400 ml of suspension in n-hexane of the support (G) prepared in Example 5 containing 370 millimoles of MgCl$_2$, 6 ml of di-isoamylether and 104 ml of a 0.77 molar solution of ethylaluminium dichloride in n-hexane.

The reactor is heated to 35° C. There are introduced in a first stage, gradually over 1 hour, 100 ml of a 0.5 molar solution of titanium tetrachloride in n-hexane. At the end of this introduction there are added rapidly to the reaction mixture 48 ml of a 0.625 molar solution of diethylaluminium monochloride in n-hexane. Then in the second stage there are again introduced, gradually over 1 hour, 100 ml of a 0.5 molar solution of titanium tetrachloride in n-hexane. At the end of this latter introduction, the reaction mixture is heated to 80° C. and maintained at this temperature for 2 hours. The solid product obtained is then washed five times with n-hexane to give the catalyst (J) ready for use. Analysis of this catalyst (J) shown that it contains per gramme atom of total titanium:
0.94 gramme atom of trivalent titanium,
0.06 gramme atom of tetravalent titanium,
2.8 gramme atoms of magnesium,
10.2 gramme atoms of chlorine,
0.50 gramme atom of aluminium and less than 0.01 mole of di-isoamylether.

The catalyst (J) occurs in the form of spheroidal solid particles having a mean diameter by mass Dm=31 microns approximately and a particle size distribution such that Dm/Dn=1.3.

Prepolymerisation

One operates as in Example 1, except for the fact that instead of using catalyst (B), one uses catalyst (J) prepared previously. The prepolymer powder (K) obtained in this way consists of spheroidal particles having a mean diameter by mass Dm=180 microns and a particle size distribution such that Dm/Dn=1.4.

Copolymerisation

One operates as in Example 1, except for the fact that instead of using the prepolymer (C), the prepolymer (K) prepared previously is employed and the partial pressures (pp) of the various constituents of the reaction gas mixture are as follows:
pp hydrogen=0.07 MPa
pp ethylene=0.71 MPa
pp 1-butene=0.22 MPa
with a ratio of pp 1-butene/pp ethylene=0.31

The copolymer powder thus obtained has the following characteristics:
spheroidal particles having a mean diameter by mass Dm=620 microns;
density of copolymer: 0.911;
content by weight of units derived from 1-butene: 13.3%;
titanium content: 8 ppm;
bulk density: 0.41 g/cm$^3$;
melt index MI$_{2.16}$:1.5 g/10 minutes;
flow parameter, n: 1.45, n being equal to: log (MI$_{21.6}$/MI$_{2.16}$).

EXAMPLE 8 (comparative)

Preparation of the catalyst

Into a 2-liter stainless steel reactor provided with a stirrer system rotating at 300 revolutions per minute, there are introduced at ambient temperature (20° C.) 770 ml of n-hexane, 490 ml of suspension in n-hexane of the support (A) prepared in Example 1, containing 480 millimoles of MgCl$_2$, 7.9 ml of di-isoamylether and 173 ml of a 0.625 molar solution of diethylaluminium monochloride in n-hexane.

The reactor is heated to 35° C. There are introduced gradually over 2 hours 260 ml of a 0.5 molar solution of titanium tetrachloride in n-hexane. At the end of this introduction, the reaction mixture is heated to 80° C. and maintained at this temperature for 2 hours. The solid product obtained is then washed five times with n-hexane to give the catalyst (L) ready for use. Analysis of this catalyst (L) shown that it contains per gramme atom of total titanium:
0.97 gramme atom of trivalent titanium,
0.03 gramme atom of tetravalent titanium,
3.7 gramme atoms of magnesium
11.2 gramme atoms of chlorine
0.33 gramme atom of aluminium and
0.01 mole of di-isoamylether.

The catalyst (L) occurs in the form of spheroidal solid particles having a mean diameter by mass Dm=33 microns approx. and a particle size distribution such that Dm/Dn=1.4.

Prepolymerisation

One operates as in Example 1, except for the fact that instead of using the catalyst (B), the catalyst (L) prepared previously is is employed. The prepolymer powder (M) obtained in this way of spheroidal particles having a mean diameter by mass $Dm=200$ microns and a particle size distribution such that $Dm/Dn=1.4$.

Copolymerisation

One operates as in Example 1, except for the fact that instead of using the prepolymer (C), the prepolymer (M) prepared previously is employed and the partial pressures (pp) of the various constituents of the reaction gas mixture are as follows:

pp hydrogen = 0.11 MPa
pp ethylene = 0.68 MPa
pp 1-butene = 0.21 MPa with a ratio of pp 1-butene/pp ethylene = 0.31.

The copolymer powder thus obtained has the following characteristics:

spheroidal particles having a mean diameter by mass $Dm=680$ microns;
density of copolymer: 0.920;
content by weight of units derived from 1-butene: 7.4%;
titanium content: 8 ppm;
bulk density: 0.39 g/cm$^3$;
melt index, $MI_{2.16}$: 1 g/10 minutes;
flow parameter, n: 1.53, n being equal to: log ($MI_{21.6}/MI_{2.16}$).

EXAMPLE 9 (comparative)

Copolymerisation

One operates as in Example 1, except for the fact that instead of using the prepolymer (C), the prepolymer (M) prepared in Example 8 is employed and the partial pressures (pp) of the various constituents of the reaction gs mixture are as follows:

pp hydrogen = 0.13 MPa
pp ethylene = 0.84 MPa
pp 1-butene = 0.03 MPa with a ratio of pp 1-butene/pp ethylene = 0.036.

The copolymer powder thus obtained has the following characteristics:

spheroidal particles having a mean diameter by mass of $Dm=710$ microns;
density of copolymer: 0.955;
content by weight of units derived from 1-butene: 0.4%;
titanium content: 7 ppm;
bulk density: 0.46 g/cm$^3$;
melt index $MI_{8.5}$: 1.5 g/10 minutes;
flow parameter, n: 1.82, n being equal to: log ($MI_{21.6}/MI_{8.5}$)/log (21.6/8.5).

EXAMPLE 10 (comparative)

Preparation of the catalyst

Into a 2-liter stainless steel reactor provided with a stirrer system rotating at 300 revolutions per minute there are introduced at ambient temperature (20° C.) 770 ml of n-hexane, 380 ml of suspension in n-hexane of the support (A) prepared in Example 1, containing 370 millimoles of MgCl$_2$, 6 ml of di-isoamylether, 65 ml of a 0.77 molar solution of ethylaluminium dichloride in n-hexane and 80 ml of a 0.625 molar solution of diethylaluminium monochloride in n-hexane.

The reactor is heated to 35° C. There are introduced gradually over 2 hours, 200 ml of a 0.5 molar solution of titanium tetrachloride in n-hexane. At the end of this introduction, the reaction mixture is heated to 80° C. and maintained at this temperature for 2 hours. The solid product obtained is washed five times with n-hexane to give the catalyst (N) ready for use. Analysis of this catalyst (N) shows that it contains per gramme atom of total titanium:

0.98 gramme atom of trivalent titanium,
0.02 gramme atom of tetravalent titanium,
3.7 gramme atoms of magnesium,
10.3 gramme atoms of chlorine,
0.19 gramme atom of aluminium and less than 0.01 mole of di-isoamylether.

The catalyst (N) occurs in the form of spheroidal solid particles having a mean diameter by mass $Dm=33$ microns approx. and a particle size distribution such that $Dm/Dn=1.5$.

Prepolymerisation

One operates as in Example 1, except for the fact that instead of using the catalyst (B), the catalyst (N) prepared previously is employed. A prepolymer (O) is obtained in the form of a powder consisting of spheroidal particles having a mean diameter by mass $Dm=200$ microns approx. and a particle size such that $Dm/Dn=1.6$.

Copolymerisation

One operates as in Example 1, except for the fact that instead of using the prepolymer (C), the prepolymer (O) is employed and the partial pressures (pp) of the various constituents of the reaction gas mixture are as follows:

pp hydrogen = 0.13 MPa
pp ethylene = 0.66 MPa
pp 1-butene = 0.21 MPa with a ratio of pp 1-butene/pp ethylene = 0.32.

The copolymer powder thus obtained has the following characteristics:

spheroidal particles having a mean diameter by mass $Dm=650$ microns;
density of copolymer: 0.918;
content by weight of units derived from 1-butene: 7.7%;
titanium content: 9 ppm
bulk density: 0.39 g/cm$^3$;
melt index $MI_{2.16}$: 1.5 g/10 minutes;
flow parameter, n: 1.49, n being equal to: log ($MI_{21.6}/MI_{2.16}$).

EXAMPLE 11 (comparative)

Copolymerisation

One operates as in Example 1, except for the fact that instead of using the prepolymer (C), the prepolymer (M) prepared in Example 8 is employed and the partial pressures (pp) of the various constituents of the reaction gas mixture are as follows:

pp hydrogen = 0.14 MPa
pp ethylene = 0.73 MPa
pp 1-butene = 0.13 MPa the ratio of pp 1-butene/pp ethylene is 0.178.

The copolymer powder thus obtained has the following characteristics:

spheroidal particles having a mean diameter by mass of $Dm=700$ microns;
density of copolymer: 0.929;

content by weight of units derived from 1-butene: 3.8%;
titanium content: 8 ppm
bulk density: 0.38 g/cm$^3$;
melt index, $MI_{2.16}$: 1.5 g/10 minutes;
flow parameter, n: 1.52, n being equal to: log ($MI_{21.6}$/$MI_{2.16}$).

Table A sets out the ratio of butene:ethylene employed in the gas phase copolymerisation and the density of the copolymers obtained in the Comparative Examples and the corresponding Examples in accordance with the present invention. In Comparative Example 8 and in Example 7, the same butene:ethylene ratio was employed, but the copolymer produced in Example 7 has the lower density. A similar density difference can be observed between Comparative Example 11 and Example 1. The densities of the copolymers obtained in Comparative Example 9 and Example 2 are the same, but it can be seen that a lower butene::ethylene ratio was required in the Example than in the Comparative Example. Similarly, for Comparative Example 10 and Example 5, a lower butene:ethylene ratio was required in the Example to produce a copolymer having the same density.

TABLE

| Example No | Butene:Ethylene (pp ratio) | Density of copolymer |
|---|---|---|
| 8 (Comparison) | 0.31 | 0.920 |
| 7 (Invention) | 0.31 | 0.911 |
| 9 (Comparison) | 0.036 | 0.955 |
| 2 (Invention) | 0.016 | 0.955 |
| 10 (Comparison) | 0.32 | 0.918 |
| 5 (Invention) | 0.194 | 0.918 |
| 11 (Comparison) | 0.178 | 0.929 |
| 1 (Invention) | 0.178 | 0.920 |

We claim:

1. Process for the preparation of a supported catalyst, the support containing magnesium chloride as a major component and optionally aluminium chloride and occurring in the form of spheroidal particles having a mean diameter by mass comprised between 10 and 100 microns and a particle size distribution such that the ratio of the mean diameter by mass Dm to the mean diameter by number Dn is less than or equal to 3, on which support there is precipitated a metal of a transition compound belonging to Groups IV, V and VI of the Periodic Table of Elements, the process being characterised in that the precipitation is performed by a reduction reaction in two stages of a compound of the said transition metal taken at its maximum valency, the first stage of the reduction reaction being carried out by means of a reducing agent chosen from among alkylaluminium dihalides of the formula Al(R$_8$)X$_2$ in which R$_8$ is an alkyl group containing from 2 to 12 carbon atoms and X is a chlorine or bromine atom, the second stage of the reduction reaction being carried out by means of another reducing agent chosen from among the organo-metallic compounds of metals belonging to Groups II and III of the Periodic Table of Elements and having in respect of the compounds of the said transition metals a greater reducing power than that of the alkylaluminium dihalides, the relative molar quantities of the various compounds employed being such that:
magnesium chloride and the optional aluminium chloride of the support/transition metal compound is comprised between 1 and 50,
alkylaluminium dihalide used in the first stage of the reduction reaction/transition metal compound, is comprised between 0.2 and 2,
reducing agent used in the second stage of the reduction reaction/transition metal compound, comprises between 0.1 and 2, at least 10% of the total quantity of the transition metal compound employed reacting in the first stage of the reduction reaction with the alkylaluminium dihalide.

2. Process according to claim 1, characterised in that the support has a particle size distribution such that the ratio Dm:Dn of the mean diameter by mass to the mean diameter by number of the particles is comprised between 1.1 and 2.5.

3. Process in accordance with claim 1, characterised in that the support has a particle size distribution such that the ratio Dm:Dn is comprised between 1.1 and 1.5.

4. Process in accordance with claim 1, characterised in that the support contains products comprising at least 1 Mg—C bond and an electron donor compound, and in that its density is comprised between 1.2 and 2.2.

5. Process in accordance with claim 1, characterised in that the support has a specific surface area comprised between 20 and 60 m$^2$/g (BET).

6. Process in accordance with claim 1, characterised in that the transition metal compound is a titanium compound, of the formula Ti(OR$_7$)$_{(4-n)}$X$_n$ in which R$_7$ is an alkyl group containing from 2 to 6 carbon atoms, X is a chlorine or bromine atom and n is a whole number or a fraction such that $2 \leq n \leq 4$.

7. Process in accordance with claim 6, characterised in that the titanium compound is titanium tetrachloride.

8. Process in accordance with claim 1, characterised in that the reducing agent chosen among alkylaluminium dihalides is ethylaluminium dichloride or isobutylaluminium dichloride.

9. Process in accordance with claim 1, characterised in that the reducing agent used in the second stage of the reduction reaction is chosen from among organomagnesium compounds of the formula R$_9$MgR$_{10}$ in which R$_9$ and R$_{10}$ are identical or different alkyl groups containing from 2 to 12 carbon atoms, organo-zinc compounds of the formula Zn(R$_{11}$)$_{(2-y)}$X$_y$ in which R$_{11}$ is an alkyl group having from 2 to 12 carbon atoms, X is a chlorine or bromine atom and y is equal to 0 or a fraction less than 1, and organo-aluminium compounds of the formula Al(R$_{12}$)$_{(3-x)}$X$_x$ in which R$_{12}$ is an alkyl group having from 2 to 12 carbon atoms, X is a chlorine or bromine atom and x is a whole number or fraction such that $0 \leq x \leq 2$.

10. Process in accordance with claim 1, charactersied in that the reduction reaction is performed in the presence of an electron donor compound chosen from among the organic compounds comprising at least one atom of oxygen, sulphur, nitrogen, or phosphorus, in a quantity such that the molar ratio of the electron donor compound to the transition metal compound is comprised between 0 and 5.

11. Process in accordance with claim 10, characterised in that the electron donor compound is an aliphatic ether oxide of the formula R$_{13}$OR$_{14}$ in which R$_{13}$ and R$_{14}$ are identical or different alkyl groups comprising from 1 to 12 carbon atoms.

12. Process in accordance with claim 11, characterised in that the aliphatic ether oxide is used in a quantity such that the molar ratio of the aliphatic ether oxide to the transition metal compound is comprised between 0.1 and 0.5.

13. Process in accordance with claim 1, charactersied in that the precipitation is performed at a temperature comprised betwen −30° C. and 100° C., with stirring, in a liquid hydrocarbon medium.

14. A catalyst prepared according to the process of claim 1, characterised in that the catalyst comprises (i) chlorides, and optionally bromides of magnesium, (ii) chlorides and optionally bromides of aluminium and optionally of zinc or of another metal of Groups II and III of the Periodic Table of Elements, and (iii) a compound of a transition metal of Groups IV, V and VI of the said Table, in a valency stated less than its maximum value, in that they occur in the form of spheroidal particles having a mean diameter by mass comprised between 10 and 100 microns and a particle size distribution such that the ratio Dm:Dn is less than or equal to 3, and in that they are capable of producing ethylene copolymers of a density comprised between 0.910 and 0.960, by copolymerisation in the gas phase at a temperature of 80° C., of mixtures of ethylene and 1-butene such that the ratio of the partial pressure of 1-butene to that of ethylene is at most equal to 0.35, or of mixtures of ethylene and 4-methyl-1-pentene such that the ratio of the partial pressure of 4-methyl-1-pentene to that of ethylene is at most equal to 0.20.

15. A process in accordance with claim 1, wherein the relative molar quantities of the various compounds employed is such that:

magnesium chloride and the optional aluminium chloride of the support/transition metal compound comprises between 2.5 and 10, alkylaluminium dihalide used in the first stage of the reduction reaction/transition metal compound comprises between 0.3 and 0.8, and reducing agent used in the second stage of the reduction reaction/transition metal compound, comprises between 0.3 and 0.6.

16. A process in accordance with claim 5, wherein the support has a smooth surface.

17. A process in accordance with claim 10, wherein the molar ratio of the electron donor compound to the transition metal compound is comprised between 0.1 and 1.

18. A process in accordance with claim 13, wherein the precipitation is performed at a temperature comprised between 5° C. and 50° C., with stirring, in a liquid hydrocarbon medium.

19. A process in accordance with claim 9, wherein the reducing agent used in the second stage of the reduction reaction is an organo-aluminium compounds of the formula $Al(R_{12})_{(3-x)}X_x$ in which $R_{12}$ is an alkyl group having from 2 to 12 carbon atoms, X is a chlorine or bromine atom and x is a while number or fraction such that $0 \leq x \leq 2$.

20. A process in accordance with claim 19, wherein the reducing agent used in the second stage of the reduction reaction is diethylaluminium monochloride.

* * * * *